US008418543B2

(12) United States Patent
Tentrup et al.

(10) Patent No.: US 8,418,543 B2
(45) Date of Patent: Apr. 16, 2013

(54) DEVICE AND METHOD FOR DETERMINING AND ADJUSTING THE CHASSIS GEOMETRY OF A VEHICLE

(75) Inventors: Thomas Tentrup, Mechern (DE); André Deutsch, Herbitzheim (FR); Thomas Kolb, Blieskastel (DE)

(73) Assignee: Duerr Assembly Products GmbH, Puettlingen (DE)

( * ) Notice: Subject to any disclaimer, the term of this patent is extended or adjusted under 35 U.S.C. 154(b) by 81 days.

(21) Appl. No.: 12/737,927

(22) PCT Filed: Sep. 1, 2009

(86) PCT No.: PCT/DE2009/075047
§ 371 (c)(1),
(2), (4) Date: May 2, 2011

(87) PCT Pub. No.: WO2010/025723
PCT Pub. Date: Mar. 11, 2010

(65) Prior Publication Data
US 2011/0271749 A1 Nov. 10, 2011

(30) Foreign Application Priority Data
Sep. 2, 2008 (DE) .......................... 10 2008 045 307

(51) Int. Cl.
*G01M 17/06* (2006.01)
(52) U.S. Cl.
USPC ....................................................... 73/117.02
(58) Field of Classification Search ................ 73/117.02
See application file for complete search history.

(56) References Cited

U.S. PATENT DOCUMENTS 5,675,515 A * 10/1997 January .......................... 700/279
5,724,128 A *  3/1998 January ..................... 356/139.09
5,724,129 A *  3/1998 Matteucci ................. 356/139.09
(Continued)

FOREIGN PATENT DOCUMENTS
DE      299 06 813        9/1999
DE      10 2006 036 671   2/2008
DE      10 2007 003 086   7/2008
WO      WO 2008/028832    3/2008

OTHER PUBLICATIONS
International Search Report.

*Primary Examiner* — Freddie Kirkland, III
(74) *Attorney, Agent, or Firm* — Collard & Roe, P.C.

(57) ABSTRACT

The invention relates to a device and method for determining and adjusting the chassis geometry of a vehicle. In order to provide a device for determining and adjusting vehicle chassis geometry, which can be manufactured as inexpensively as possible, the invention proposes that two tracks be provided on which the vehicle can be moved from a position A to a position B, each track having two means to permit lateral relaxation of the vehicle wheels as well as rotary discs located in the area of the vehicle's front axle at position B, that a measuring sensor operating according to the principle of stereophotogrammetry is located on the outside of each of the tracks, and that means for measuring the travel of the measuring sensors and a steering-wheel balance for detecting the position of the steering wheel are provided. This configuration of the device makes it possible to create a chassis-geometry testing and adjusting rig that does not require floating plates with driven roller pairs for uniform rotation of the wheels but still permits reproducible toe and camber-angle measurements accurate down to angular minutes.

1 Claim, 2 Drawing Sheets

U.S. PATENT DOCUMENTS

| | | |
|---|---|---|
| 6,209,209 B1 | 4/2001 | Linson et al. |
| 6,219,134 B1 | 4/2001 | Voeller et al. |
| 6,341,013 B1 * | 1/2002 | Battiti et al. .............. 356/139.09 |
| 6,532,673 B2 * | 3/2003 | Jahn et al. ....................... 33/193 |
| 6,748,796 B1 * | 6/2004 | Van Den Bossche ...... 73/116.01 |
| 7,065,462 B2 * | 6/2006 | Merrill et al. ................... 702/95 |
| 7,907,265 B2 * | 3/2011 | Tentrup et al. ........... 356/139.09 |
| 7,974,806 B1 * | 7/2011 | Burns et al. .................... 702/105 |
| 2002/0040533 A1 | 4/2002 | Jahn et al. |
| 2009/0046279 A1 | 2/2009 | Tentrup et al. |

\* cited by examiner

DEVICE AND METHOD FOR DETERMINING AND ADJUSTING THE CHASSIS GEOMETRY OF A VEHICLE

CROSS REFERENCE TO RELATED APPLICATIONS

This application is the National Stage of PCT/DE2009/075047 filed on Sep. 1, 2009, which claims priority under 35 U.S.C. §119 of German Application No. 10 2008 045 307.2 filed on Sept. 2, 2008, the disclosure of which is incorporated by reference. The international application under PCT article 21(2) was not published in English.

BACKGROUND OF THE INVENTION

1. Field of the Invention

The invention relates to a device and method for determining and adjusting the chassis geometry of a vehicle.

2. The Prior Art

The DE 10 2007 003 086 A1 describes a device for measuring the vehicle geometry of vehicles, especially of buses and lorries, said device having, in the direction of the vehicle's longitudinal axis, translationally adjustable wheel-receiving means upon which the front and/or rear wheels of the vehicle are positionable and which is arranged in a horizontal plane, and measuring systems being provided. A device of this kind has at least four wheel-receiving means adjustable in the direction of the vehicle's longitudinal axis, at least one rotary disc for receiving a wheel being located on each of said wheel-receiving means.

The DE 10 2006 036 671 A1 describes a method for determining a vehicle's axle geometry, in which light of a given structure is projected on a vehicle wheel and the diffusely reflected light is analyzed in order to determine therefrom the orientation of the plane of the vehicle wheel, several lines of laser light generated by one or several laser-light sources are projected on the wheel, one or several of these lines is/are faded in or out in temporal succession and the reflected light is captured by means of one or a plurality of cameras. The tire sidewall contours can be used to determine the maximum tire bead widths. For an ideal tire, they lie on a circle and define a possible wheel plane. In the case of a vehicle standing on its wheels during wheel alignment, the tire is deformed in the vicinity of the point where it contacts the floor, so that for calculating the plane, only contours can be used that are not in the vicinity of this point. On account of the tire lettering and lateral tire runout, one determines the orientation of the vehicle-wheel plane that is perpendicular to the wheel's axis of rotation via what is known as a reversal measurement. A reversal measurement involves averaging the vehicle-plane orientations measured during one rotation of the wheel. This chassis-geometry measuring system is sold by Dürr Assembly Products GmbH under the name "x-3Dprofile measuring system for chassis geometry". The VisiCon dPP compact sensor used here operates according to the measuring principle of stereophotogrammetry. The wheel to be measured is illuminated by lasers (expanded into lines by cylindrical lenses) of high light intensity, which form a planar dot matrix and can be switched individually.

SUMMARY OF THE INVENTION

The object of this invention is to provide a device for determining and adjusting vehicle chassis geometry, which can be manufactured as inexpensively as possible.

This object is established in that two tracks are provided on which the vehicle can be moved from a position A to a position B, each track having two means to permit lateral relaxation of the vehicle wheels as well as rotary discs located in the area of the vehicle's front axle at position B, that a measuring sensor operating according to the principle of stereophotogrammetry is provided on the outside of each of the tracks, and that means for measuring the travel of the measuring sensors and a steering-wheel balance for detecting the position of the steering wheel are provided.

This configuration of the device makes it possible to create a chassis-geometry testing and adjusting rig that does not require floating plates with driven roller pairs for uniform rotation of the wheels but still permits reproducible toe and camber-angle measurements accurate down to angular minutes. The vehicle is moved by its own engine (in which case a worker drives it) or may be moved by an automated process, and thus requires no conveyor system. This cuts costs significantly and also reduces the cycle time for the vehicles under production.

According to the invention, the means permitting lateral relaxation of the vehicle are movable plates that can be displaced in the y direction.

Alternatively, it is also possible to provide roller beds as means to permit lateral relaxation of the vehicle.

It is within the scope of the invention that each of the measuring sensors is movable over the entire length of the tracks.

A refinement of the invention is characterized in that four measuring sensors operating according to the principle of stereophotogrammetry are provided, each being assigned to one vehicle wheel and preferably being movable between the positions A and B.

A further refinement of the invention consists in that rotary discs are also provided in the area of the vehicle's rear axle, at position B.

It is within the scope of the invention that the distance between the positions A and B is between 0.3 and 1 m.

The scope of the invention also includes a method of determining and adjusting a vehicle's chassis geometry, comprising the following steps:

Fitting of a steering-wheel balance, and driving the vehicle to a position A, where, at said position A, the vehicle wheels are disposed on means permitting lateral relaxation of the vehicle, Recording of the toe and camber angles as well as the x, y and z positions of the front wheel centers in position A via measuring sensors operating according to the principle of stereophotogrammetry, Recording of the toe and camber angles as well as the x, y and z positions of the rear wheel centers in position A via measuring sensors operating according to the principle of stereophotogrammetry, Calculation of all the vehicle's toe and camber angles in position A relative to the vehicle's symmetrical axis and to the steering-wheel position.

Movement of the vehicle to a position B, in which the vehicle wheels not to be aligned stand on means permitting lateral relaxation of the vehicle and the vehicle wheels to be aligned are disposed on rotary discs, Recording of the toe and camber angles as well as the x, y and z positions of the rear wheel centers in position B via measuring sensors operating according to the principle of stereophotogrammetry, Recording of the toe and camber angles as well as the x, y and z positions of the front wheel centers in position B via stereophotogrametrically operating measuring sensors, Calculation of all the vehicle's toe and camber angles in position B relative to the vehicle's symmetrical axis and to the steering-wheel position, Calculation of the toe and camber angles of all the wheel axes while compensating for lateral runout, Adjustment of the individual front toe angles while the front wheels are on the rotary discs and the angles are measured continuously by the stereophotogrammetrically operating measuring sensors at position B of the front axle.

It is possible here either to move the measuring sensors from the front axle to the rear axle or to have measuring sensors located both in the area of the front axle and in the area of the rear axle. The measuring sensors are moved between the positions A and B of one and the same axle unless this distance is very small. In the latter case, the measuring sensors may also be positioned between the two positions A and B.

BRIEF DESCRIPTION OF THE DRAWINGS

An embodiment of the invention is explained below in more detail by reference to drawings.

DETAILED DESCRIPTION OF THE PREFERRED EMBODIMENTS

Figure 1A:
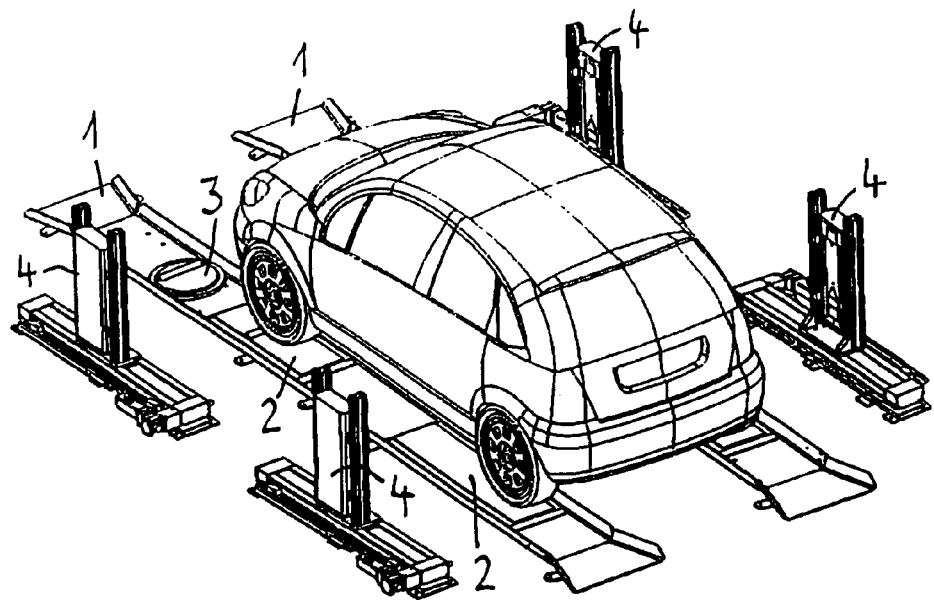
FIG. 1a and FIG. 1b illustrate two devices according to the invention.
Figure 1B:
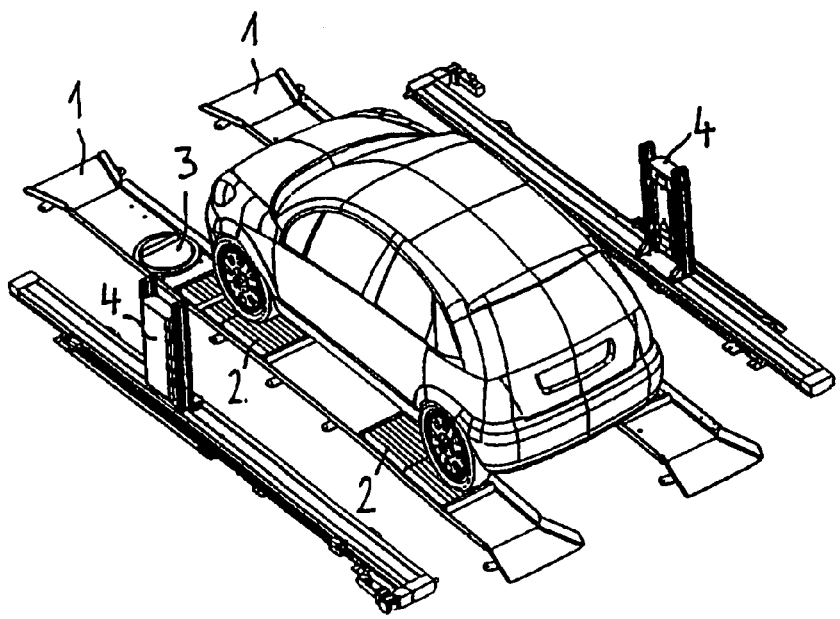

As shown in FIGS. 1a and 1b, the device according to the invention has two tracks 1, each with two means 2 for relaxing the vehicle (making it stress-free), which are engineered here in FIG. 1a as movable plates 2 and in FIG. 1b as roller beds 2 for receiving the vehicle wheels. The movable plates 2 are movable in the y direction. At least in the area of the vehicle's front axle, rotary discs 3 are provided at position B; if the rear axle is also to be aligned, rotary discs must also be provided in the area of the rear axle at position B. A stereophotogrammetrically operating measuring sensor 4 (VisiCon dPP compact sensor of the kind used by Dürr Assembly Products GmbH in its x-3Dprofile measuring system for chassis geometry) is located on the outside of each track 1 and can be moved along the entire length of the track 1 (i.e., in the x direction). Means for measuring the travel of the measuring sensors 4 are also provided. Finally, a (preferably wireless) steering-wheel balance (not shown) for measuring the position of the steering wheel is provided, the values measured by it being processed mathematically with the steering angle of the front axle.

Figure 2:
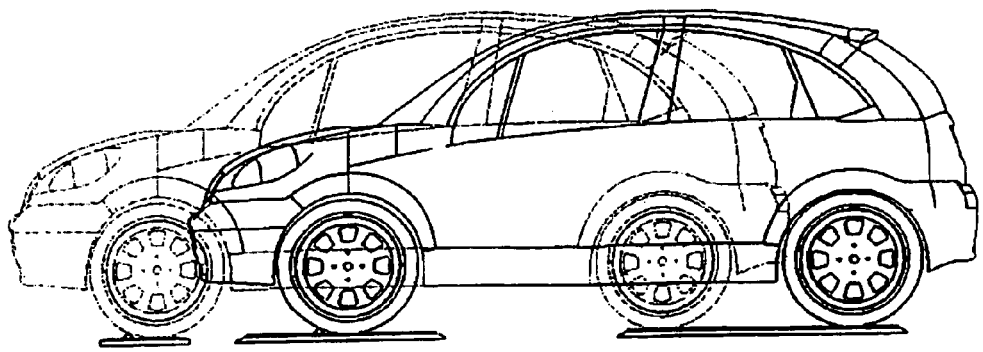
FIG. 2 illustrates a vehicle in positions A and B.

FIG. 2 shows a vehicle in the positions A (solid outline) and B (dotted outline).

The chassis geometry of a vehicle is measured on the outsides of the tires. On the outside of the tire there is raised lettering, and the tire itself has a "wobble" or lateral runout when it rotates by an angle φ about the wheel axis. Wheel toe α and camber angle β are accordingly a function of rotation j about the wheel axis, i.e. α (φ), β (φ). The actual toe or camber angle of the wheel is the toe or camber angle α or β of the wheel axis, and is calculated from the mean value of the functions α(φ), β(φ) over one revolution of the wheel:

$$\alpha = (1/2\pi)\int_0^{2\pi} \alpha(\varphi)\,d\varphi$$

$$\beta = (1/2\pi)\int_0^{2\pi} \beta(\varphi)\,d\varphi$$

To obtain reproducible toe and camber-angle measurements accurate down to angular minutes, the tires must be rotated uniformly during measurement on a chassis rig by means of floating plates with driven roller pairs.

In order to provide a chassis-geometry testing and adjusting rig (chassis rig in short) that does not have floating plates with driven roller pairs for uniform rotation of the wheels but still permits reproducible toe and camber-angle measurements accurate down to angular minutes, the following property of the x-3D profile measuring sensor for chassis geometry is used: the lettering on the tire is virtually averaged away via the combination of the full three-dimensional image obtained for the tire sidewall combined with suitable algorithms for toe and camber angle measurements. With the x-3Dprofile measuring sensor for chassis geometry, one obtains in this case for the functions α(φ) and β(φ):

$$\alpha(\phi)=\alpha+s^*\sin(\phi) \tag{1a}$$

$$\beta(\phi)=\beta+s^*\sin(\phi+\pi/2) \tag{1b}$$

where α(φ), β(φ) are the toe and camber angles measured by the x-3Dprofile measuring sensor for chassis geometry at an unknown angle of rotation φ, the actual toe and camber angles α, β are those of the wheel axis and s is the wheel's lateral runout.

Figure 3:
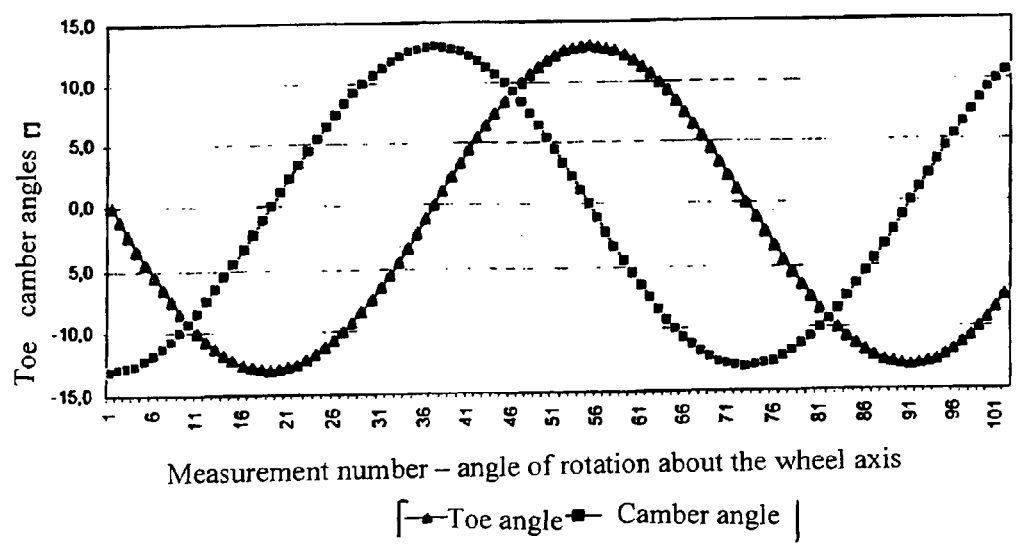
FIG. 3 shows toe and camber-angle plots obtained with a device according to the invention.

FIG. 3 shows toe and camber-angle plots obtained with a device according to the invention.

If one now measures the toe and camber angles $\alpha_A$, $\beta_A$ with the x-3Dprofile measuring sensor for vehicle geometry at a position A of the vehicle in the direction of travel, where the wheel assumes an angle of rotation $\phi_A$, one obtains according to (1a, 1b):

$$\alpha_A=\alpha(\phi_A)=\alpha+s^*\sin(\phi_A) \tag{2a}$$

$$\beta_A=\beta(\phi_A)=\beta+s^*\sin(\phi_A+\pi/2) \tag{2b}$$

If the vehicle and the x-3Dprofile measuring sensor for vehicle geometry now move in the direction of travel (x direction) to position B, where the distance |A−B| in the direction of travel is approx. $U_{Rad}/2=\pi^*R_{Rad}$ ($U_{Rad}$=wheel circumference, $R_{Rad}$=wheel radius), the wheel assumes the angle of rotation $\phi_B$. One obtains according to (1a, 1b):

$$\alpha_B=\alpha(\phi_B)=\alpha+s^*\sin(\phi_B) \tag{3a}$$

$$\beta_B=\beta(\phi_B)=\beta+s^*\sin(\phi_B+\pi/2) \tag{3b}$$

For the angle of rotation $\phi_B$ in position B the following applies:

$$\phi_B=\phi_A+\delta \text{ where } \delta=|A-B|/R_{Rad} \tag{4}$$

In addition to the toe and camber angles, the x-3Dprofile measuring sensor for vehicle geometry measures the x, y and z coordinates of the wheel centers and can also measure the wheel radius $R_{Rad}$. The travel of the sensor in the x direction is also measured. The distance |A−B| is thus known, and δ can be calculated according to (4). Inserting (4) into (3a), one obtains:

$$\alpha_B=\alpha+s^*\sin(\phi_A+\delta) \tag{5a}$$

$$\beta_B=\beta+s^*\sin(\phi_A+\delta+\pi/2) \tag{5b}$$

The four equations (2a, 2b) and (5a, 5b) form an equation system for calculating the four unknowns $\alpha$, $\beta$, s and $\varphi_A$, thereby solving the problem of calculating the toe and camber angles $\alpha$, $\beta$ of the wheel axis while compensating for lateral wheel runout (wheel wobble).

Calculation of the toe and camber angles $\alpha$, $\beta$ of the wheel axis is particularly easy in two cases:

Case 1: $|A-B|=U_{Rad}/4=(\pi/2)*R_{Rad}$, i.e. the distance $|A-B|$ is approximately 0.5 m for customary wheel radii, and for $\delta$ the following applies:

$$\delta=\pi/2 \quad (6)$$

Inserting (6) into (5a, b), one obtains:

$$\alpha_B = \alpha + s^*\sin(\varphi_A + \pi/2) \quad (7a)$$
and
$$\beta_B = \beta + s^*\sin(\varphi_A + \pi) \quad (7b)$$
$$= \beta - s^*\sin(\varphi_A)$$

From (2b) and (7a) one obtains:

$$\alpha_B-\alpha=\beta_A-\beta \quad (8a)$$

and from (2a) and (7b):

$$\alpha_A-\alpha=\beta-\beta_B \quad (8b)$$

One thus obtains
the toe angle $\alpha$ of the wheel axis from (8a)+(8b): $\alpha=[\alpha_A+\alpha_B-(\beta_A-\beta_B)]/2$
the camber angle $\beta$ of the wheel axis from (8a)-(8b)]: $\beta=[\beta_A+\beta_B+(\alpha_A-\alpha_B)]/2$ If the required distance $|A-B|$ is substantially less than 1 meter, the vehicle can be measured in positions A and B without moving the x-3D measuring sensor for chassis geometry. The x-3Dprofile measuring sensor for chassis geometry is located in this case between the positions A and B.

Case 2: $|A-B|=U_{Rad}/2=, \pi/*R_{Rad}$, i.e. the distance $|A-B|$ is approximately 1 meter for customary wheel radii, and for $\delta$ the following applies:

$$\delta=\pi \quad (9)$$

Inserting (9) into (5a, b), one obtains:

$$\alpha_B = \alpha + s^*\sin(\varphi_A + \pi) = \alpha - s^*\sin(\varphi_A) \text{ and} \quad (10a)$$
and
$$\beta_B = \beta + s^*\sin(\varphi_A + \pi + \pi/2) = \beta - s^*\sin(\varphi_A + \pi/2) \quad (10b)$$

One thus obtains
the toe angle $\alpha$ of the wheel axis from (2a)+(10a): $\alpha=(\alpha_A+\alpha_B)/2$
the camber angle $\beta$ of the wheel axis from (2b)+(10b)]: $\beta=(\beta_A+\beta_B)/2$ The stages of a vehicle-geometry measurement with the device illustrated in FIG. 1 are as follows (the x-3Dprofile measuring sensors will now be referred to as measuring sensors)

Measuring sensors are located at position A for the front axle,
Following identification of the vehicle and with the steering-wheel balance in place, a worker drives the vehicle, keeping it straight, to position A,
Measuring sensors record the toe and camber angles and the x, y and z positions of the front wheel centers in position A,
Measuring sensors move to position A for the rear axle,
Measuring sensors record the toe and camber angles and the x, y and z positions of the rear wheel centers in position A,
Calculation of all the toe and camber angles in position A relative to the vehicle's symmetrical axis and to the steering-wheel position.
Worker drives the vehicle straight ahead to position B,
Measuring sensors move to position B for the rear axle,
Measuring sensors record the toe and camber angles and the x, y and z positions of the rear wheel centers in position B,
Measuring sensors move to position B for the front axle,
Measuring sensors record the toe and camber angles and the x, y and z positions of the front wheel centers in position B,
Calculation of all the toe and camber angles in position B relative to the vehicle's symmetrical axis and to the steering-wheel position.
Calculation of the toe and camber angles of all the wheel axes while compensating for lateral runout,
Adjustment of the individual front toe angles with the front wheels standing on the rotary discs, the angles being measured continuously by the measuring sensor at position B of the front axle,
Worker in the pit acknowledges "Adjustment completed",
Steering-wheel balance is removed from the vehicle, and vehicle is driven out of the rig,
Measuring sensors move to position A for the front axle.

The vehicle can, of course, be driven by an automated system instead of a worker into the chassis rig, from position A to position B and out of the rig again.

The invention claimed is:

1. Method for determining and adjusting a chassis geometry of a vehicle, comprising the following steps:
   Fitting of a steering-wheel balance, and driving the vehicle to a position A, where, at said position A, the vehicle wheels are disposed on devices permitting lateral relaxation of the vehicle,
   Recording of the toe and camber angles as well as the x, y and z positions of the front wheel centers in position A via measuring sensors operating according to the principle of stereophotogrammetry,
   Recording of the toe and camber angles as well as the x, y and z positions of the rear wheel centers in position A via measuring sensors operating according to the principle of stereophotogrammetry,
   Calculation of all the vehicle's toe and camber angles in position A relative to the vehicle's symmetrical axis and to the steering-wheel position,
   Movement of the vehicle to a position B, in which the vehicle wheels not to be aligned stand on devices permitting lateral relaxation of the vehicle and the vehicle wheels to be aligned are disposed on rotary discs,
   Recording of the toe and camber angles as well as the x, y and z positions of the rear wheel centers in position B via measuring sensors operating according to the principle of stereophotogrammetry,
   Calculation of all the vehicle's toe and camber angles in position B relative to the vehicle's symmetrical axis and to the steering-wheel position,
   Calculation of the toe and camber angles of all the wheel axes while compensating for lateral runout,
   Adjustment of the individual front toe angles while the front wheels are on the rotary discs and the angles are measured continuously by the photogrammetrically operating measuring sensors at position B of the front axle.

<p style="text-align:center">* * * * *</p>

UNITED STATES PATENT AND TRADEMARK OFFICE
CERTIFICATE OF CORRECTION

PATENT NO. : 8,418,543 B2  Page 1 of 1
APPLICATION NO. : 12/737927
DATED : April 16, 2013
INVENTOR(S) : Tentrup et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 142 days.

Signed and Sealed this
First Day of September, 2015

Michelle K. Lee
*Director of the United States Patent and Trademark Office*